Sept. 23, 1969      C. G. G. BARRETO      3,468,209
APPARATUS FOR FACILITATING THE PLAYING OF MUSICAL INSTRUMENTS
Filed Feb. 14, 1966      3 Sheets-Sheet 1
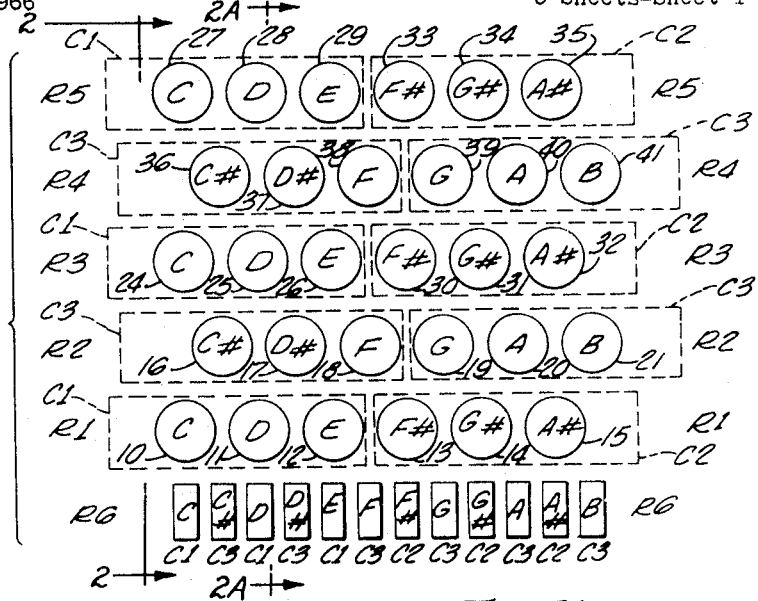
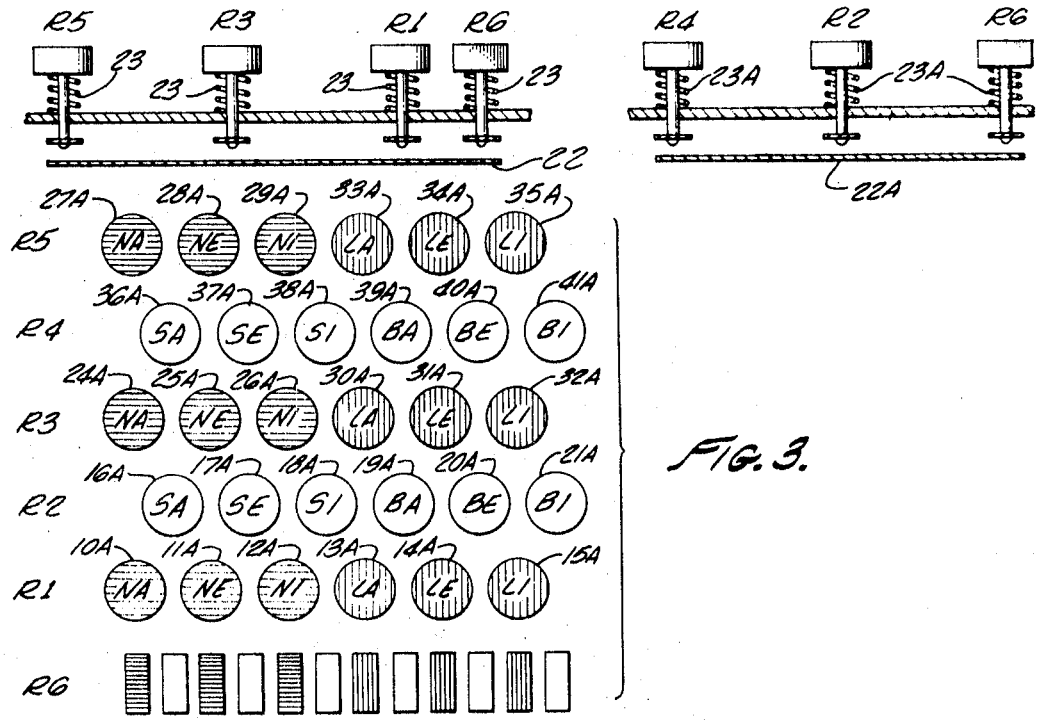
CLODOVEO GUILLERMO GONZALEZ BARRETO
INVENTOR.
BY *Hazard & Miller*
ATTORNEYS Sept. 23, 1969      C. G. G. BARRETO      3,468,209
APPARATUS FOR FACILITATING THE PLAYING OF MUSICAL INSTRUMENTS
Filed Feb. 14, 1966      3 Sheets-Sheet 3
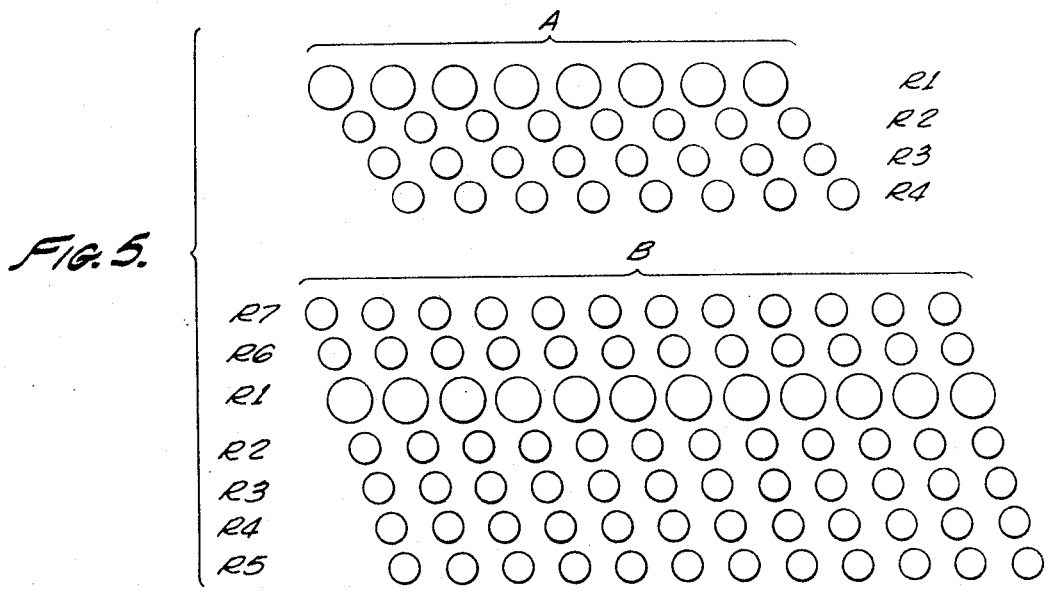
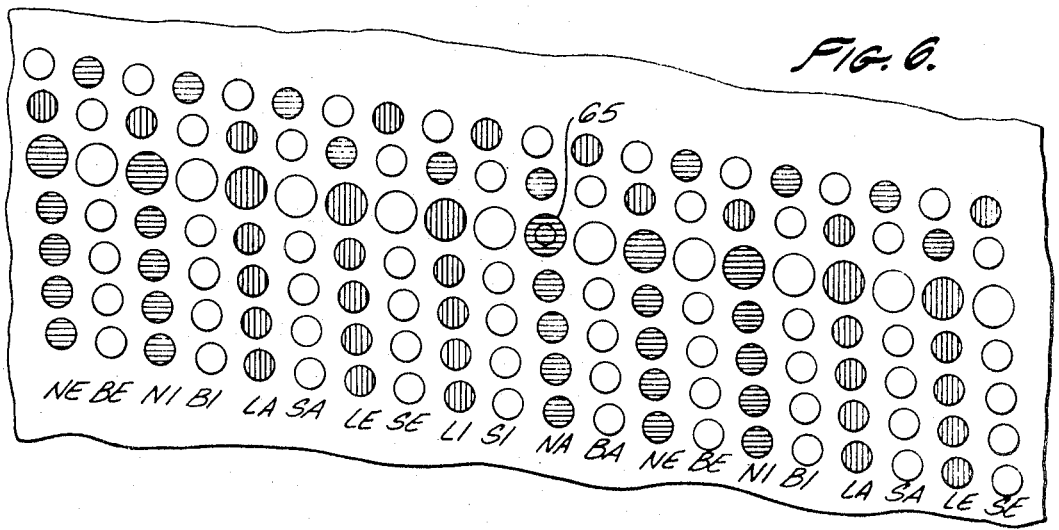
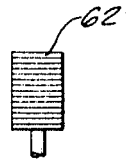
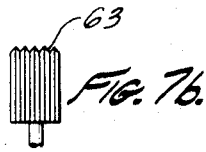
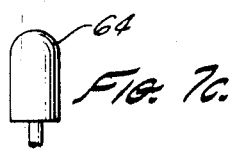
CLODOVEO GUILLERMO GONZALEZ BARRETO
INVENTOR.
BY *Hagard & Miller*
ATTORNEYS

United States Patent Office 3,468,209
Patented Sept. 23, 1969

3,468,209
APPARATUS FOR FACILITATING THE PLAYING OF MUSICAL INSTRUMENTS
Clodoveo Guillermo Gonzalez Barreto, Caldas 484, Quito, Ecuador
Filed Feb. 14, 1966, Ser. No. 527,198
Int. Cl. G10c *3/12;* G10d *11/00*
U.S. Cl. 84—423                              5 Claims

ABSTRACT OF THE DISCLOSURE

A symmetrical keyboard to facilitate the fingering of the keys by providing staggered rows of keys which correspond to a scale of six sounds which are between themselves at equal ascendent intervals of one tone, from left to right. The diameter of the keys and the distances between them are approximately the same as on a common typewriter, in order to make the keys easy to reach over for small hands in simple scales or by octaves, in chords and arpeggi.

---

This invention relates to apparatus for learning the playing of musical instruments according to a special method.

The object of the invention is to facilitate the study and the practice of music.

For that, the invention consists of a new melodic keyboard and introduces new important features on the existent keyboard of the piano, organ, accordion and the like.

This invention is in direct relation with a new method of learning and playing of musical instruments.

The above and other objects will become apparent from the following description in connection with the accompanying drawings:

FIG. 1 is a diagrammatic arrangement of the grouping and positioning of the keys of the new symmetrical keyboard according to the invention FIG. 2 is a section taken approximately on the line 2—2 of FIG. 1;

FIG. 2A is a section taken approximately on the line 2A—2A of FIG. 1;

FIG. 3 is a view somewhat similar to FIG. 1 showing differentiating color designations;

FIG. 4E shows an octave of the dodecaphonic "Rondador."

FIGS. 5A and 5B are diagrammatic arrangements of partial bass or left hand button keyboards, such as modified on an accordion type arrangement.

FIG. 6 is a diagrammatic arrangement of a complete accordion type bass keyboard showing color designations to differentiate sets of related keys;

FIG. 7A is a side view of one shape of a bass key or button, such as shown in FIG. 6;

FIG. 7B is a side view of another shape of bass key or button;

FIG. 7C is a side view of still another shape of bass key or button.

Figure 4:
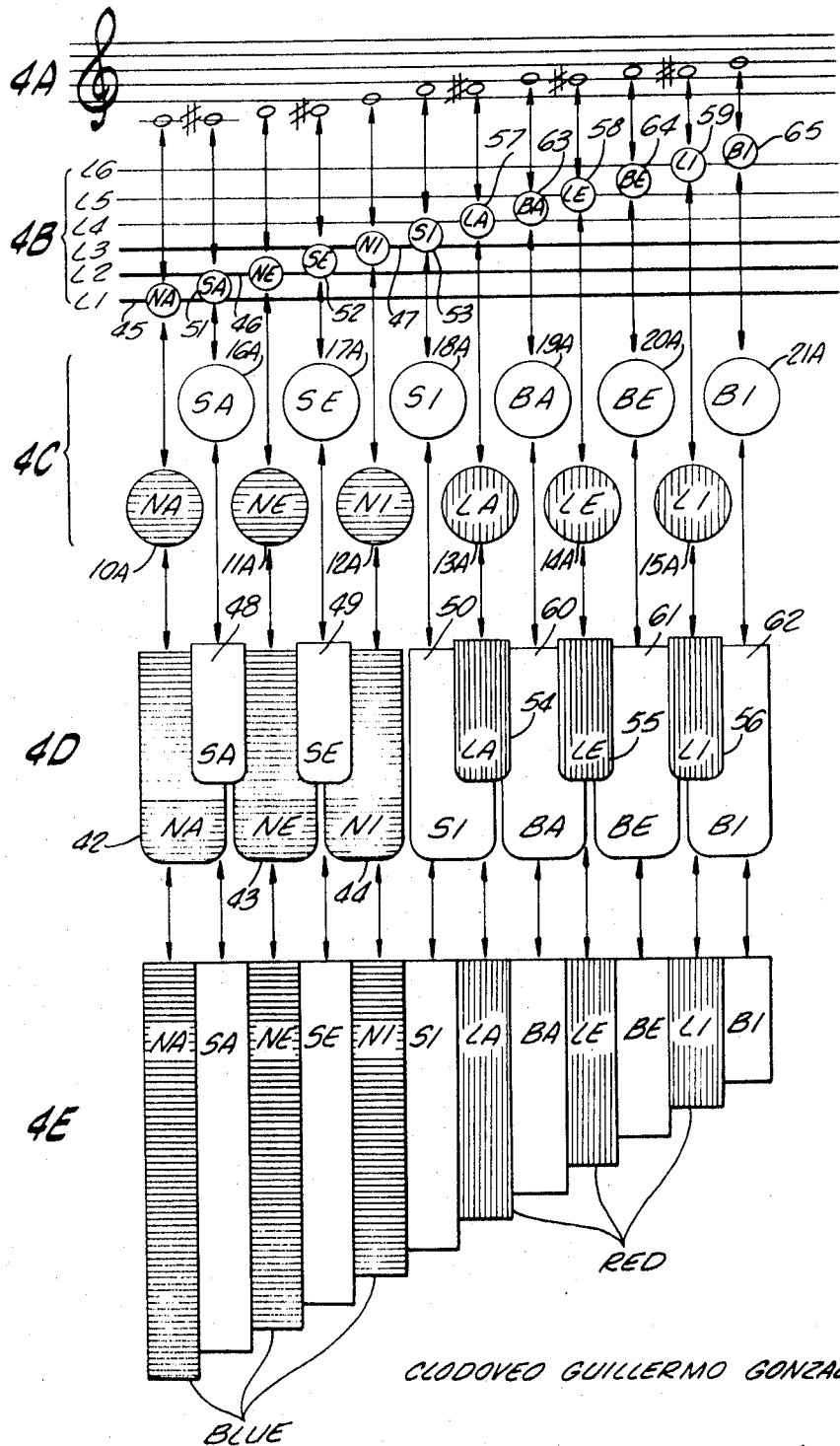
FIG. 4 is a diagrammatic view of the fundamental section of the new symmetrical keyboard (FIG. 4C), of an octave of the common keyboard with the partial application of the invention (FIG. 4D), and their relation to a chromatic octave written in the standard musical staff (FIG. 4A) as well as in the new staff of my invention (FIG. 4B).

The melodic keyboard has features that distinguish it from other types of keyboards.

As shown in FIG. 1 the keys, which are round shaped, are arranged in five rows: R1, R2, R3, R4 and R5. Also, there is a sixth row R6 formed by rectangular keys. The new sounds disposition is as follows: The keys 10, 11, 12, 13, 14 and 15 that make up row R1 are those that correspond to the sounds C, D, E naturals, F sharp, G sharp and A sharp, respectively. That is to say, this row is formed by the keys that correspond to a scale of six sounds which are between themselves at equal ascendant intervals of one tone, from left to right, starting with key 10, which is for the sound C natural. It is understood that key 13 or F sharp can be considered enharmonically like G flat; key 14 or G sharp like A flat; and key 15 or A sharp like B flat. This observation is available for all the description of the invention. The row R2 is formed by the keys 16, 17, 18, 19, 20 and 21 that correspond respectively to the sounds C sharp, D sharp, F natural, G natural, A natural and B natural. That is to say, the keys of the second row make up a second scale of six sounds, which are between themselves at equal ascendant intervals of one tone, from left to right beginning from key 16 of sound C sharp. It is understood that key 16 or C sharp can be considered enharmonically like D flat, and key 17 or D sharp like E flat. This observation is available for all the description of the invention. The third row R3 and the fifth row R5 are repetitions of the keys of the first row R1, with the same sounds of the same octave. The row R4 is a repetition of the R2 row, with the same sounds of the same octave. The keys of the rows R2 and R4 are located with regard to the keys of the rows R1, R3 and R5, to the right, in such a way that the center of each key of the rows R2 and R4 will coincide with the middle of the empty space between the keys of the rows R1, R3 and R5, as shown in FIG. 1. In the summation of the advantages of this keyboard, it will be explained why the keys of the row R1 are duplicated in row R3 and triplicated in row R5. Meanwhile, the keys of the row R2 are only duplicated in row R4. The diameter of the keys and the distances between these are approximately the same as on a common typewriter, in order to make the keys easy to reach over for small hands, in simple scales or by octaves, in chords and arpeggi. In front of the first row R1 of round keys there is a sixth row of keys R6, in which are in ascendent order from left to right, by semitones, alternately, the sounds of rows R1, R2, R3, R4 and R5, making a complete chromatic scale. For obvious reasons the shape of the keys on row R6 is rectangular as shown in FIG. 1. FIG. 1 represents the keys of a complete octave, understanding the arrangement of the keys is the same in all octaves, superior or inferior, whether these are complete or whether only fractions of an octave.

According to what has been explained previously, each one of the twelve sounds of the chromatic scale can be obtained by pressing any one of the two or three round keys or the corresponding rectangular key. To obtain this, the two or three round keys and the rectangular key that corresponds to each one of the twelve sounds are located approximately on a common mechanism, whether forming a single piece with it, whether obtaining the same aim through mechanical contact (or it might be electrical) between each key of the same sound and its common mechanism. The left side of FIG. 2 shows the profile of a common mechanism of the three round keys and the rectangular one that corresponds to each one of the six sounds of the keys that form the rows R1, R3, R5 and R6; and the right side of FIG. 2 shows by profile the location in a common mechanism of the two round keys and the rectangular key, corresponding to each of the six sounds of the keys that make the rows R2, R4 and R6 of FIG. 1. In the left of FIG. 2 the three round keys and the rectangular key of the rows R1, R3, R5 and R6 are separated from a commonly operated mechanism 22 by springs 23. Pressing any one of these keys, contact is made with the common mechanism 22 to open a corresponding air valve (not shown), vibrating the corresponding reeds of the musical instrument. The right side of FIG. 2 shows the disposition of the keys with their springs 23A and common mechanism of contact 22A corresponding to the sounds of the keys in rows R2, R4 and R6.

In order to identify easily each one of the keys, three different colors are used. In FIG. 3 in the rows R1, R3 and R5 grouping with the first color, the keys 10, 11 and 12, 24, 25 and 26, 27, 28 and 29 of the sounds C, D and E naturals; and with a second color the keys 13, 14 and 15, 30, 31 and 32, 33, 34 and 35 of the sounds F sharp, G sharp and A sharp, in two clearly differentiated series of three keys to each series. A third color is applied to all the keys 16 through 21 of row R2 and keys 36 through 41 of row R4, corresponding to the sounds C sharp, D sharp, F. G, A and B naturals, respectively. It is not necessary to apply two different colors in these rows; however, the use of a third color to group the keys of the sounds C sharp, D sharp and F natural, and of a fourth color to group the keys of the sounds G, A and B naturals of the rows R2 and R4 would be but the same application of the invention. As will be seen below, the keys of rows R2 and R4 are grouped in two series of three keys each one by the use of two different colors of printed letters. FIG. 1 shows the groups of keys of an octave. The first color C1 is used to identify the three keys that correspond to the sounds C, D and E naturals in the rows R1, R3 and R5. The second color C2 is used to identify the three keys of the second group that correspond to sounds F sharp, G sharp and A sharp in the same rows R1, R3 and R5. The third color C3 is used to identify the six keys that correspond to the sounds C sharp, D sharp, F, G, A, and B naturals in the rows R2 and R4. In the sixth row R6 of the same FIG. 1, each of one of the twelve rectangular keys uses the color that corresponds to it; this color is the same as those of the round keys of the same sound and name placed in the common mechanism; that is, in this row R6 of the chromatic scale are used the same three colors.

Of the large number of possible combinations of colors, two dark colors like blue and red are preferred in the rows R1, R3 and R5, and one light color like white (considered as a color for this purpose) for the keys of the rows R2 and R4, in the following way: A dark color, for example blue, is applied to the keys 10–12, 24–29 of the sounds C, D and E naturals; a second dark color, for example red, is applied to the keys 13–15, 30–35 of the sounds F sharp, G sharp and A sharp in the rows R1, R3 and R5; and a third light color, for example white for this purpose, is used for the keys 16–21, 36–41 of the sounds C sharp, D sharp, F, G, A and B naturals. FIG. 4 shows this use of colors in a complete chromatic octave, understanding that all the octaves, complete or incomplete, are similar. In the drawings the optional use of the blue color is symbolized by thin horizontal lines; the optional use of the red is represented by thin vertical lines; and the optional use of the white, naturally, is symbolized by the absence of lines.

Analogically, other color combinations can be used as other applications of the same invention consisting in differentiating the keys by groups of three by three, which sounds are at intervals of one tone, by the use of a different color for each group.

As shown in FIG. 3, for simplicity of study and musical practice, each key has its name printed with the following novel nomenclature. The keys labeled NA, NE and NI correspond to sounds C, D and E natural respectively, which is to say, the keys 10A, 11A and 12A, 24A, 25A and 26A, 27A, 28A and 29. The keys labeled LA, LE and LI, or F sharp, G sharp and A sharp respectively, relate to their order to the keys 1A, 14A and 15A, 30A, 31A and 32A, 33A, 34A and 35A. The keys labeled SA, SE and SI, or C sharp, D sharp and F natural respectively, relate in their order to the keys 16A, 17A and 18A, 36A, 37A and 38A. The keys labeled BA, BE and BI, or G, A, and B naturals, relate respectively, to the keys 19A, 20A and 21A, 39A, 40A and 41A. The white keys of the rows R2 and R4 are grouped in two series of three keys each, the set of keys 16A–18A and 36A–38A corresponding to the sounds C sharp, D sharp and F natural, have their names printed in the same color as the keys C, D and E naturals of the rows R1, R3 and R5 in such a manner that if these keys were blue the names of those would be printed in blue. Meanwhile, the white keys 19A-21A and 39A-41A of the same rows R2 and R4 corresponding to the sounds G, A and B naturals, have their names printed in the same color of the keys F sharp, G sharp and A sharp of the rows R1, R3 and R5, in such a manner that if these keys were red, the names of those would be in red. The aim of this original classification is double: First, to group all the twelve round shaped keys of an active in two main basic groups of six keys each, using for each one a main color, and subdividing into two small groups of three keys each that differ between themselves by use of a color in the keys of sounds C, D and E naturals, or NA, NE and NI, and in the printed names of the white keys C sharp, D sharp and F natural or SA, SE and SI; and of a second color in the keys of the sounds F sharp. G sharp and A sharp or LA, LE and LI, and in the printed names of the white keys G, A and B naturals or BA, BE and BI.

The second purpose of this classification is to put the optional colors of the keys in relation with the optional colors of the lines and with the spaces of the hexagrama or new staff or six colored lines of FIG. 4 so: the three keys, optionally blue, 10A, 11A and 12A of my symmetrical keyboard, and 42, 43 and 44 of the common keyboard, corresponding to sounds C, D and E naturals (NA, NE, NI) are in correlation with the three blue lines 45, 46 and 47 (NA, NE, NI) of the hexagrama in their order; and the three optionally white keys 16A, 17A and 18A of my symmetrical keyboard and 48, 49 and 50 of the common keyboard, corresponding to sounds C sharp, D sharp and F natural (SA, SE, SI), are in correlation with the spaces 51, 52 and 53 (SA, SE, SI) above these blue lines of the hexagrama. The three keys, optionally red, 13A, 14A and 15A of my symmetrical keyboard and 54, 55 and 56 of the common keyboard, corresponding to sounds F sharp, G sharp and A sharp (LE, LE, LI) are in correlation with the three red lines 57, 58 and 59 (LA, LE, LI) of the hexagrama in their order; and the three optionally white keys 19A, 20A and 21A of my symmetrical keyboard and 60, 61 and 62 of the common keyboard, corresponding to sounds G, A and B naturals (BA, BE, BI), are in correlation with the three spaces 63, 64 and 65 (BA, BE, BI) above these red lines.

The names of the keys NA, NE, NI, LA, LE, LI could be engraved or embossed, or in white or in black.

In order to distinguish easily the keys of an octave with respect to the keys of another octave, the names of the keys of each octave are printed with different types of additional signs. For example, the name of the keys of one octave will be in capitals, and the names of others, in the lower case or in cursive letters or may be underlined, etc.

The differences between my keyboard and the common keyboards of the piano, organ, accordion, etc. are evident. They are as follows: My invention has round keys and rectangular keys, and common keyboards have plain and long keys of an irregular form (white keys) and some smaller and prominent keys (black keys). My keyboard has its keys arranged with accomplished symmetry by its shape and by its position in relation to intervals, scales, chords and arpeggi; a characteristic which is lacking in the common keyboards. My keyboard employs three or four keys for each one sound; the common keyboard has only one key for each sound. My keyboard has a special row (R6 in FIG. 1) of keys in which there are all twelve sounds of the chromatic scale in immediately consecutive order, a characteristic which also is lacking in the common keyboard. My keyboad eliminates black and employs three colors, in ordinate way, while the common keyboards use only the white and black in an irregular form. In my keyboard the colors have huge practical and didactical importance; whereas, the common keyboard has only white and black keys used in only a routine way.

The differences between my keyboard and the melodic keyboards with buttons of the accordions, commonly called "chromatic" are the following: In my keyboard, the chromatic scale is obtained by alternating the sounds of one row with those of the next superior or inferior rows of round keys, in such a way that between the sound of a round key of any one row and the sound of the nearest round key of the superior or inferior row, there is always the interval of one semitone, and between the sounds of two keys that are one after the other in the same row, there is always the interval of one tone. In the keyboard with buttons of the chromatic accordions, the sounds of the chromatic scale are not obtained in two but in three rows, and, although their keys proceed by semitones, these follow one after the other in four groups of little slanted rows of three sounds each (without considering the repeated rows). This arrangement gives the result that between two sounds of the keys placed next to each other of a same main row, there is an interval of third minor, rending difficult the study of the scales, chords, etc. This occurs in the keyboards of the chromatic accordions of French, Italian or Swedish systems, and the "Charleroi" Belgian system.

While in the melodic keyboards of the chromatic accordions the colors are used in arbitrary manner, according to tastes or judgements of the different manufacturers, the three colors used in my keyboard, as in FIG. 3, have an eminently scientific purpose, as well as didactical and practical, because these colors, besides helping to identify the keys, also help in the reading of the written music according to my system in a special hexagrama of six colored lines, because the sounds of the keys of a color are written on the lines of the same color, while the white keys have correlation to spaces, naturally white, of the hexagrama, as previously explained. It is repeated that in the new, as well as in existent keyboards, as much as in the hexagrama, it is possibe to employ other colors instead of the blue and the red. In this case, the characteristics of the invention are that there is to be a total and exact correspondence between the colors and spaces of the hexagrama, on one hand, and, on the other hand, of the keys of keyboards, as shown in FIG. 4. Besides other optional combinations of colors, the green can be used for the keys C, D and E, and for the lines of the hexagrama destined for the the writing of these three sounds; and the brown color for these three keys, F sharp, G sharp and A sharp, and for the three superior lines of the hexagrama destined for the writing, in their order, of these three sounds. The spaces, naturally white, are assigned for the writing of the sounds of the white keys inserted between those of colors. The melodic keyboard of the chromatic accordions do not have an extra row as does mine, in which all the twelve sounds of the chromatic scale are located.

As explained, the new symmetrical arrangement of the keys, established in a logical and easy manner, and the uniform shape of the keys of the new keyboard produces an absolute uniformity that is easily understood between all the keys in relation to the intervals of their relative sounds. The theoretical and practical knowledge can be, in this way, simplified not only with regard to the intervals, but also with regard to the scales, chords and arpeggi, reducing to only one the study of all the twelve intervals of a same kind; to only one all the twelve scales of a same kind, and to only one all the twelve chords of a same kind, etc. For example, all the twelve major diatonic scales are obtained by playing successively three keys of a row and the four next keys of the upper or inferior row from left to right. To produce any one of the twelve major chords it is just necessary to put the fingers in the same manner to the one used for the C major chord; by simply moving the hand from one side to another, or down or up in such a way that the thumb would press the fundamental note of the new chord.

The logical disposition of the keys in a symmetrical way and the uniformity of the same fingering for all the intervals, scales, chords and arpeggi of a same kind or species, help the rapidity of the study and the agility of the performance with the consequent savings of efforts, of time and the cost of studies because the agility obtained with the practice of an interval, of a scale, of a chord, or of an arpeggio, increases automatically the greater ease and agility of the performance of all the other intervals, scales, chords and arpeggi of the same species, an advantage that is not found in an asymmetrical keyboard like the one of the common piano, accordion, and instruments with similar keyboards, which requires a greater effort in the practical study on account of the variety of the fingering that is used for the intervals, scales, chords and arpeggi of a same species.

The duplication and triplication of the keys by rows with the same sounds, makes easier the use of the fingers, in such a way that the small fingers like the thumb and little finger, would play the keys of the anterior rows R1 and R2 of FIG. 1, and the long fingers like the index, the middle finger and the ring finger, would play the keys on the back rows R3, R4 and R5. For example, in order to play the C major ascendant diatonic scale, it is proper the following way: the thumb touches the C key of the first row R1 (FIG. 1); the index and middle fingers touch the keys D and E of the third row R3; the thumb passes to the F key of the second row (R2); the index, middle and ring fingers touch the G, A and B keys of the fourth row (R4), to conclude the octave on C key of the third row (R3) with the little finger, or continue to superior octave beginning again on the C key of the first row (R1), and repeating then the same procedure. In the same manner the use of the fingers and rows is used to play the D, E, F sharp, G sharp and A sharp major ascendant diatonic scales. Likewise, is identical the employment of the fingers or "fingering" for the C sharp, D sharp, F, G, A, and B naturals major ascendant diatonic scales, with the only difference consisting in that all the movement of the fingers passes to a posterior row. This is the reason why the triplication of the row R1 on the row R5 is necessary. So, the C major ascendant diatonic scale is learned, virtually already are known all the twelve major ascendant diatonic scales, because they use one easy and identical fingering. As is noticed, this same thing happens with other scales, and chords and arpeggi of the same kind.

The round and plain shape of all the keys obliges the fingers to be on a curved position according to pianistic techniques, avoiding the tension of the muscles and tendons of the fingers. The round form of the keys, their adequate size and the reduction of the distance between them, makes it easy to play, giving the necessary smoothness to the movements of the fingers and simplifying the intervals, scales, chords and arpeggi, etc. even for small hands. The foregoing advantages are, up to a certain point, common to my keyboard and to the melodic keyboards of the chromatic accordions, with the very valuable difference that they study on the former, from the beginning, is easy and fast because of the logical and simple arrangement of the keys, while in the latter, the initial study, which is decisive for most beginners, the results are difficult and slow because of the illogical disposition of the keys in relation to their sounds. In other words, my keyboard has all the advantages, but avoids all the disadvantages of the keyboards with buttons of the common chromatic accordions. The chromatic scale, particularly, is easy of performance with my keyboard because it is easy to make a finger slide on the row R6, FIG. 1, to play with precision at the speed desired, in ascendant or descendant way over the rectangular keys.

An important advantage of the keyboard is the use of colors which give an immediate identification of each key, and that eases the formulation of theoretical-practical rules to produce intervals, scales, chords and arpeggi. But the most important advantage of my keyboard is that, by the use of colors, the keys set a perfect correspondence with the lines and the spaces of the colored hexagrama or new staff of six colored lines as shown in FIG. 4B and FIG. 4C. In FIG. 4B, the three blue lines are symbolized by thick lines L1, L2 and L3, and three red lines by thin lines L4, L5 and L6. The clefs of traditional use are replaced by simple numeration of the octaves (named "dodecades" in the new method) of the keyboards and the writing of the respective number in the hexagrama. With this aid the reading of the musical notes reduces to a simple visual and mechanical procedure that diminishes to a minimum the effort of musical reading.

The partial use of my invention, consistent on the employment of the colors of my symmetrical keyboard in the common keyboard, comprise an important improvement in the common keyboard because, as previously explained, in relation, the keys and the lines and spaces of the hexagrama greatly facilitate the formulation of theoretic-practical rules. The said colors gainfully applied to a common piano keyboard, to keyboards of various kinds of organs (tubular, electronic, reed organs) inclusively the pedal keyboard, to accordions with keyboards similar to that of the piano, and to other musical instruments with similar keyboards, whether they are instruments for professionals, whether they are musical toys, etc. In these cases, the colors are applied in covers of the exact shape of each key, expressly manufactured of plastic material, of aluminum or any other adequate material, or directly in the keys themselves.

FIG. 4D shows an octave of a keyboard whose keys are identified by employment of three colors, according to the specifications of the invention as stated above.

In the partial use of my invention, the colors of my keyboard can likewise be applied in the most expedient way to the marimba, to the xylophone, or to the keyboard of the carillon, and generally to all the chromatic instruments provided by keys, or buttons, or any other mechanisms that utilize keys or their equivalents. These colors are also used in stringed and fretted instruments like the guitar, the mandolin, the cithara, the banjo, the ukulele, the balalaika, etc., by the use of small colored marks underneath each string between the frets, according to the different sounds that each string produces in the respective fret, fitting the already disclosed characteristics of my keyboard. On the hard and other similar instruments, those colors can be employed by marks annexed to pegs on places which make each the identification of the strings according to their relative sounds.

The colors of my keyboard are applied also to instruments that, without keys or buttons, or any other mechanism that would take the place of keys, have visible parts in relation to their sounds. FIG. 4E, for example, shows a chromatic octave of an instrument I term as dodecaphonic Rondador (similar to Pan's pipes), whose pipes or flutes (which can be manufactured of any adequate material) are colored according to sounds that they produce, and according to this invention.

In my accordion type instrument, the bass keyboard or series of buttons of the bass for the accompaniment have features which differ from the bass keyboard of common accordions. The buttons of the row of the fundamental basses are bigger than all the others, that is to say, they have a diameter that is bigger than that of all the other buttons of the chords and of the major and minor contrabasses. In FIG. 5, Section A, the row R1 shows the differences of size of the buttons of the fundamental basses with respect to all the others (R2, R3 and R4) in a bass keyboard of four rows of buttons. Section B of the same FIG. 5 shows a portion of a bass keyboard of seven rows. The row R1, with its buttons larger than the others, represents the row of the buttons of fundamental basses; R2, the row of the major chords; R3, that of the minor chords; R4, that of the dominant seventh chords; and R5, that of diminished seventh chords. The row R6 contains the buttons of major contrabasses; and the row R7, that of the minor contrabasses. This section shows a portion of a bass keyboard of 140 buttons.

It is obvious that it is an advantage, particularly for the initial study, to be able to identify immediately the principal row R1 of the fundamental bass as the point of departure or of guidance for localizing and identifying immediately all the other buttons of the bass keyboard.

In the bass keyboard of my accordion type instrument, the same three colors of the keyboard of FIG. 3 are used, which are the same also as the lines of the hexagrama L–1 through L–6 of FIG. 4, applying those as shown in FIG. 6 in the bass keyboard of my accordion type instrument of 140 buttons, understanding that the bass keyboard of an accordion with lesser number of buttons are but portions of it. A first color (blue, for example) is applied to the buttons of the fundamental basses C, D and E, and to all the buttons of its respective chords, as well as the major and minor contrabasses that produce the sounds C, D and E. A second color (for example, red), to all the buttons of the fundamental basses F sharp, C sharp and A sharp, and to all the buttons of the respective chords as well as the buttons of the major and minor contrabasses that produce the sounds F sharp, G sharp and A sharp. A third color (for example, the white considered as color for this purpose) is applied to the buttons of the fundamental basses C sharp, D sharp, F, G and A and B naturals, and to all the buttons of the respective chords, as well as to the buttons of the major and minor contrabasses that produce the sounds C sharp, D sharp, F, G, A and B naturals.

The buttons of the bass keyboard of my accordion type instrument differ from others by their surfaces in order that they may be identified by feeling in the following way: All the blue buttons 62 (that is to say the fundamental basses C, D and E, the buttons of the respective chords and the major and minor contrabasses of these names) have a plain, smooth surface as in FIG. 7A. All the red buttons 63 (that is to say, the fundamental basses F sharp, G sharp and A sharp, the buttons of the respective chords and the buttons of the major and minor or roughened as in FIG. 7B. All the white buttons 64 (that is to say, the buttons of the fundamental basses C sharp, D sharp, F, G, A and B naturals, the buttons of the respective chords and the buttons of the major and minor contrabasses of these names) have their surcontrabasses of these names) have their surfaces brabbed faces convex and smooth, as in FIG. 7C. Independently, the button 65 of the fundamental bass C has a small hole that serves as principal guide. By using these surfaces on the buttons for their identification by feeling, one can carry out varied modifications without getting away from the essence of the invention in this point.

In the ordinary bass keyboard, all buttons have the same size, surface and color, with the exception of the fundamental bass C, which has a small pit or small hole as guidance for the feeling. The accordions of sixty or more basses have sometimes a little difference on the surface of the buttons of the fundamental basses A flat and E natural, as additional guidances. Sometimes colors are used in the buttons of the basses, but in a purely ornamental form. The practical study on a common bass keyboard whose buttons are alike and with very limited and insufficient guidances is very difficult, especially for the beginner. The large leaps of the fingers that have to be made between distant buttons in usual accordion bass keyboard require a great deal of practice until this can be done almost by intuition. On the contrary, on the buttons of my accordion bass keyboard, the visual identification is eased by the use of colors, and the different kinds of surfaces helps the identification by feeling and lets one perceive the positions of buttons with relation to others, one being a guidance for the others.

I claim as my invention:

1. A symmetrical musical instrument keyboard for facilitating the playing of musical instruments having keys which comprises two basic rows of keys for a chromatic octave, the first row, from left to right, for the six sounds C natural, D natural, E natural, F sharp, G sharp and A sharp being at equal ascendant intervals of a tone; the second row, likewise from left to right, for the six sounds C sharp, D sharp, F natural, G natural, A natural and B natural being at equal ascendant intervals of a tone, the keys of the said two rows being staggered relative to each other in such a manner that playing alternately the first key of the first row, the first key of the second row, the second key of the first row, the second key of the second row and so the remaining keys in that order, by consecutive intervals of semitones, an entire chromatic octave is played, said symmetrical keyboard having succeeding alternating identical rows of keys, respectively to those of the two basic rows, in such a manner that the third row is an exact repetition of the first row, the fourth row is an exact repetition of the second row, the fifth row is an exact repetition of the first and the third rows, and an additional row of twelve keys in front of said first-mentioned rows of keys, said twelve keys being for sounds providing a complete chromatic octave, the first key of said additional row corresponding to sound C natural, that is to say to the first key of each of the odd-numbered rows, the second key of said additional row corresponding to sound C sharp, that is to say to the first key of the even-numbered rows, and the remaining keys of said additional row being similar to the remaining keys of said odd and even-numbered rows alternately.

2. A symmetrical musical instrument keyboard for facilitating the playing of musical instruments having keys which comprises two basic rows of keys for a chromatic octave, the first row, from left to right, for the six sounds C natural, D natural, E natural, F sharp, G sharp and A sharp being at equal ascendant intervals of a tone; the second row, likewise from left to right, for the six sounds C sharp, D sharp, F natural, G natural, A natural and B natural being at equal ascendant intervals of a tone, the keys of the said two rows being staggered relative to each other in such a manner that playing alternately the first key of the first row, the second key of the second row and so the remaining keys in that order, by consecutive intervals of semitones, an entire chromatic octave is played, said symmetrical keyboard having succeeding alternating identical rows of keys, respectively to those of the two basic rows, in such a manner that the third row is an exact repetition of the first row, the fourth row is an exact repetition of the second row, the fifth row is an exact repetition of the first and the third rows, and an additional row of twelve keys in front of said first-mentioned rows of keys, said twelve keys being for sounds providing a complete chromatic octave, the first key of said additional row corresponding to sound C natural, that is to say to the first key of each of the odd-numbered rows, the second key of said additional row corresponding to sound C sharp, that is say to the first key of the even-numbered rows, and the remaining keys of said additional row being similar to the remaining keys of said odd and even-numbered rows alternately, and the keys of said additional row being shaped differently from those of said odd and even-numbered rows.

3. A symmetrical musical instrument keyboard for facilitating the playing of musical instruments having keys which comprise two basic rows of keys for a chromatic octave, the first row, from left to right, for the six sounds C natural, D natural, E natural, F sharp, G sharp and A sharp being at equal ascendant intervals of a tone; the second row, likewise from left to right, for the six sounds C sharp, D sharp, F natural, G natural, A natural and B natural being at equal ascendant intervals of a tone, the keys of the said two rows being staggered relative to each other in such a manner that playing alternately the first key of the first row, the first key of the second row, the second key of the first row, the second key of the second row and so the remaining keys in that order, by consecutive intervals of semi-tones, an entire chromatic octave is played, said symmetrical keyboard having succeeding alternating identical rows of keys, respectively to those of the two basic rows, in such a manner that the third row is an exact repetition of the first row, the fourth row is an exact repetition of the second row, the fifth row is an exact repetition of the first and the third rows, an additional row of keys for sounds producing a complete chromatic octave, and the keys which produce the same sound of the same octave whether in rows odd-numbered and in the additional row, whether in rows even-numbered and in the additional row, having common sound-producing means, whereby striking of any one of the corresponding keys will produce the same sound.

4. A symmetrical musical instrument keyboard for facilitating the playing of musical instruments having keys which comprise two basic rows of keys for a chromatic octave, the first row, from left to right, for the six sounds C natural, D natural, E natural, F sharp, G sharp and A sharp being at equal ascendant intervals of a tone; the second row likewise from left to right, for the six sounds C sharp, D sharp, F natural, G natural, A natural and B natural being at equal ascendant intervals of a tone, the keys of the said two rows being staggered relative to each other in such a manner that playing alternately the first key of the first row, the first key of the second row, the second key of the first row, the second key of the second row and so the remaining keys in that order, by consecutive intervals of semitones, an entire octave is played, said symmetrical keyboard having succeeding alternating identical rows of keys, respectively to those of the two basic rows, in such a manner that the third row is an exact repetition of the first row, the fourth row is an exact repetition of the second row, the fifth row is an exact repetition of the first and the third rows, and an additional row of twelve keys in front of said first-mentioned rows of keys, said twelve keys being for sounds providing a complete chromatic octave, the first key of said additional row corresponding to sounds C natural, that is to say, to the first key of each of the odd-numbered rows, the second key of said additional row corresponding to sound C sharp, that is to say to the first key of the even-numbered rows, the remaining keys of said additional row being similar to the remaining keys of said odd and even-numbered rows alternately, the keys for the sounds C natural, D natural and E natural, those for sounds F sharp, G sharp, and A sharp, and those for sounds C sharp, D sharp, F natural, G natural, A natural and B natural, comprising the second basic row, having contrasting visual identification means for each key.

5. The structure in claim 4, and the keys of said additional row of twelve keys having surface structure contrasting from the keys of said other rows.

References Cited

UNITED STATES PATENTS 2,203,393    6/1940    Reuther _____ 84—376
2,035,683    3/1936    Zordan _____ 84—376

RICHARD B. WILKINSON, Primary Examiner

JOHN F. GONZALES, Assistant Examiner

U.S. Cl. X.R.

84—376